United States Patent
Gibbs et al.

[11] 3,906,184
[45] Sept. 16, 1975

[54] WELDING PROCESS

[75] Inventors: Francis E. Gibbs, Pleasanton; John J. Dempsey, Livermore, both of Calif.

[73] Assignee: Kaiser Aluminum & Chemical Corporation, Oakland, Calif.

[22] Filed: May 25, 1973

[21] Appl. No.: 363,898

[52] U.S. Cl. ............ 219/131 F; 219/130; 219/135
[51] Int. Cl.² ......................................... B23K 9/10
[58] Field of Search ........... 219/74, 131 F, 131 R, 131 WR, 219/124, 135, 73

[56] References Cited
UNITED STATES PATENTS

| | | | |
|---|---|---|---|
| 2,897,343 | 7/1959 | Regnauld et al. | 219/135 |
| 3,102,944 | 9/1963 | Chyle et al. | 219/73 |
| 3,122,629 | 2/1964 | Manz | 219/74 |
| 3,261,960 | 7/1966 | Lehnert | 219/131 X |
| 3,517,155 | 6/1970 | Mantel et al. | 219/131 F X |
| 3,637,973 | 1/1972 | Ukai et al. | 219/131 |
| 3,668,360 | 6/1972 | Ballis | 219/131 X |
| 3,851,137 | 11/1974 | Verhagen et al. | 219/131 F |

*Primary Examiner*—J. V. Truhe
*Assistant Examiner*—Clifford C. Shaw
*Attorney, Agent, or Firm*—Paul E. Calrow; Edward J. Lynch

[57] ABSTRACT

This invention relates to an improved method and system for automatically controlling the GMA welding process wherein the welding current is coordinated with the measured feed rate of electrode filler wire, the electrode feed rate being independently controlled. Provisions are made to accommodate current modification for out-of-position welding and also for flat and out-of-position crater filling.

15 Claims, 4 Drawing Figures

WELDING PROCESS

BACKGROUND OF THE INVENTION

This invention generally relates to the arc welding of metal products with a gas shielded consumable electrode commonly known as gas-metal-arc (GMA) or metal-inert gas (MIG) welding, and more specifically relates to a method and system for controlling such a welding process.

Several methods for the automatic control of the GMA welding process have been proposed and used. The most commonly used technique comprises using a constant wire feed rate with a constant voltage power source. This system more or less maintains a relatively constant arc length because of the inherent characteristics of the power supply. Another frequently used method (used with either constant voltage or constant current power sources) comprises controlling the feed rate of the weld filler wire in accordance with the arc voltage so as to maintain the latter at a relatively constant value. In this system, the wire feeding rate is increased to shorten the arc length or decreased to lengthen the arc length, due to the inverse relationship of wire feed rate to arc voltage. Another system which is frequently used involves the commonly termed "one knob welder" which mechanically links the wire feed rate control and the output of a constant voltage power source to provide a particular inverse relationship between wire speed and arc voltage which results in a satisfactory arc length.

Constant current power supplies are particularly suited to welding in deep grooves or other applications where there is limited arc access because this power source produces a more stable arc under these conditions. However, compared to constant voltage power sources, constant current power sources are more susceptible to "burn back", a condition wherein the electrode melts back to the contact tip in the welding gun. This results in the arc emanating from the contact tip which causes damage to the tip and to the weld. Replacement of the damaged tip is usually necessary. Burnbacks occur when there is a momentary slowdown or stoppage of the electrode filler wire. When this occurs during use of a constant current power source, the voltage increases substantially because the current is maintained relatively constant and the wire quickly melts back to the contact tip. Any automatic control strategy, which is based on measuring arc voltage and adjusting wire feed rate to maintain a desired arc voltage, is incapable of preventing the burnback because the velocity of the electrode is uncontrollable at this point. The slowdown or stoppage of the wire can occur for many reasons, but usually is due to either kinks in the wire or to an accumulation of oxide and metal particles at various points in the wire feed system. Another undesirable feature of welding systems employing a constant current power source is the inherent limitation of a maximum arc initiation current to about one and one-half times the normal welding current, which may not be enough to readily initiate the formation of the welding arc.

Frequently, it is necessary to change the ratio of current and/or voltage to wire feed rate when welding out of position (i.e., other than in the flat position) or in conditions of difficult arc access, such as in deep grooves, to maintain the desired arc length. Most of the control systems available today do not provide a convenient means for the operator to make the necessary minor changes to accommodate for out-of-position welding or tight access.

Against this background, the present invention was developed.

SUMMARY OF THE INVENTION

The present invention provides a substantially improved method and system for controlling the GMA process and particularly the GMA process utilizing an essentially constant current power supply.

In the method of the present invention, the welding current (DC) is automatically controlled in accordance with a predetermined relationship with the actual feeding rate of the electrode filler wire which is independently controlled. This method can maintain an electrode melt-off rate which is equivalent to the feeding rate of the weld filler wire and thus maintain a desired or optimum arc length. The electrode feeding rate may be independently controlled either by the operator in manual welding and semiautomatic welding or by a separate control means or other types of preprogramming for automatic welding. Because the welding or arc current of the present invention follows the actual weld wire feeding rate, burnbacks are effectively prevented because as soon as the electrode filler wire slows down or stops, the current flow follows accordingly. This control technique is particularly suitable to a constant current power source.

A further advantage for the present invention is the feature which provides the capability for crater filling. In conventional welding practice, at the end of the welding pass, normally the current is abruptly turned off leaving a crater in the molten weld pool which quickly solidifies. With crack-sensitive alloys, Y-shaped cracks appear in the crater which require grinding or chipping for removal before additional welding passes can be made. This repair work is inconvenient and time-consuming. With the present invention, the electrode feeding rate can be gradually reduced, thus gradually reducing the welding current and thereby gradually filling the crater. A method is also described for crater filling in other than the flat position.

A suitable system for controlling the welding process in accordance with the present invention includes in addition to a conventional welding gun, wire feeder and welding power source (DC) and the like, a means, such as a tachometer, for sensing the electrode wire feed rate and generating a signal representing the sensed feed rate and a suitable conditioning and amplifying means responsive to the feed rate signal to generate a welding current control signal for the welding power supply. In a preferred embodiment of the present invention, which includes a constant current welding power source, the control system includes a means to supply a high current surge for arc initiation.

BRIEF DESCRIPTION OF THE DRAWINGS

In the drawing, corresponding parts are numbered the same.

DESCRIPTION OF THE INVENTION

Figure 1:
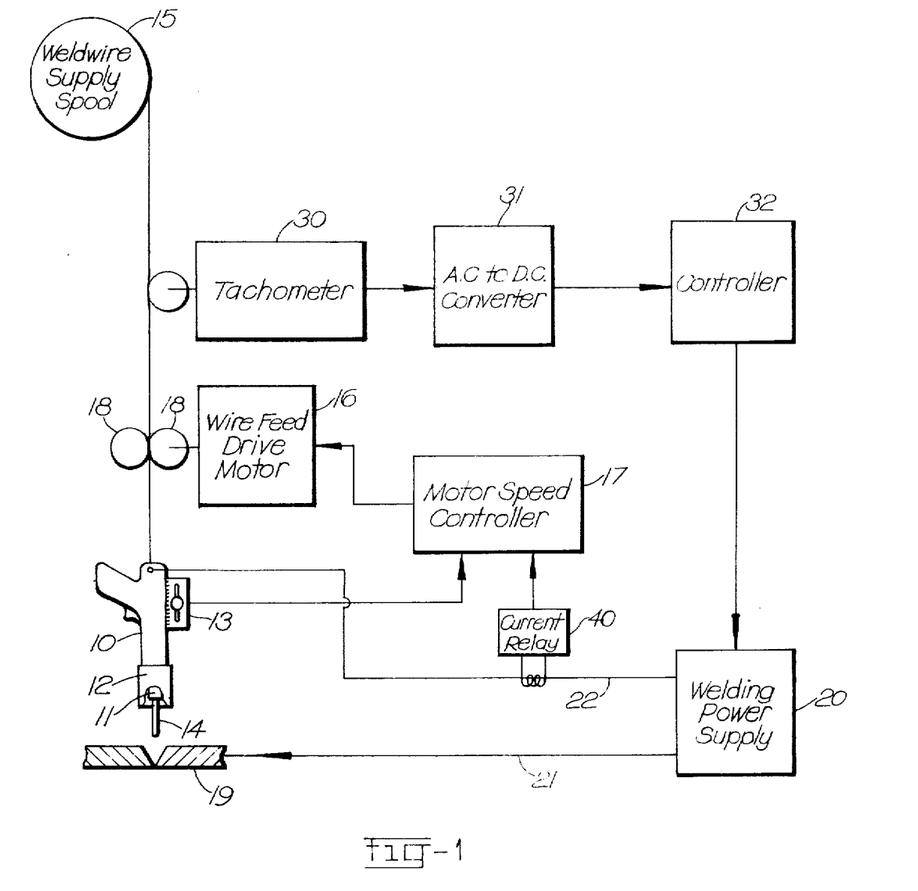
FIG. 1 is a schematic drawing of the overall welding system of the invention.

Reference is made to FIG. 1 which illustrates a highly simplified schematic diagram of a system of the present invention. The system generally comprises a welding gun 10 which includes contact tip 11, gas shield 12 and a remote electrode speed control unit 13. The electrode wire or rod 14 is drawn from the supply spool 15 by means of drive wheels 18 and motor 16 and fed to the welding gun 10. The drive motor 16 is controlled through motor controller 17 and remote control unit 13. Inert or shielding gas is supplied through conduit (not shown) to the welding gun 10. Electrode 14 and workpiece 19 are electrically connected to a suitable welding power supply 20 through conductors 21 and 22. The welding current control unit of the system comprises a means for measuring or sensing the wire velocity, such as tachometer 30, and AC-DC converter 31 (not needed if tachometer output is DC) and signal conditioning and amplifying unit (controller) 32. In operation, the tachometer 30 generates a signal (usually AC) in response to the sensed electrode feeding rate and this signal is fed to the AC-DC converter 31, converted to a DC signal and then fed to the controller unit 32 for amplification and conditioning. In controller unit 32, the signal representing the actual wire feed rate is modified so as to generate a second signal in accordance with a predetermined relationship between wire feed rate and welding current (usually a linear relationship) so the ouput can be utilized as the control signal for the welding power supply 20. Preferably, a current relay override unit 40 is provided to prevent any electrode movement until current is flowing.

Figure 2:
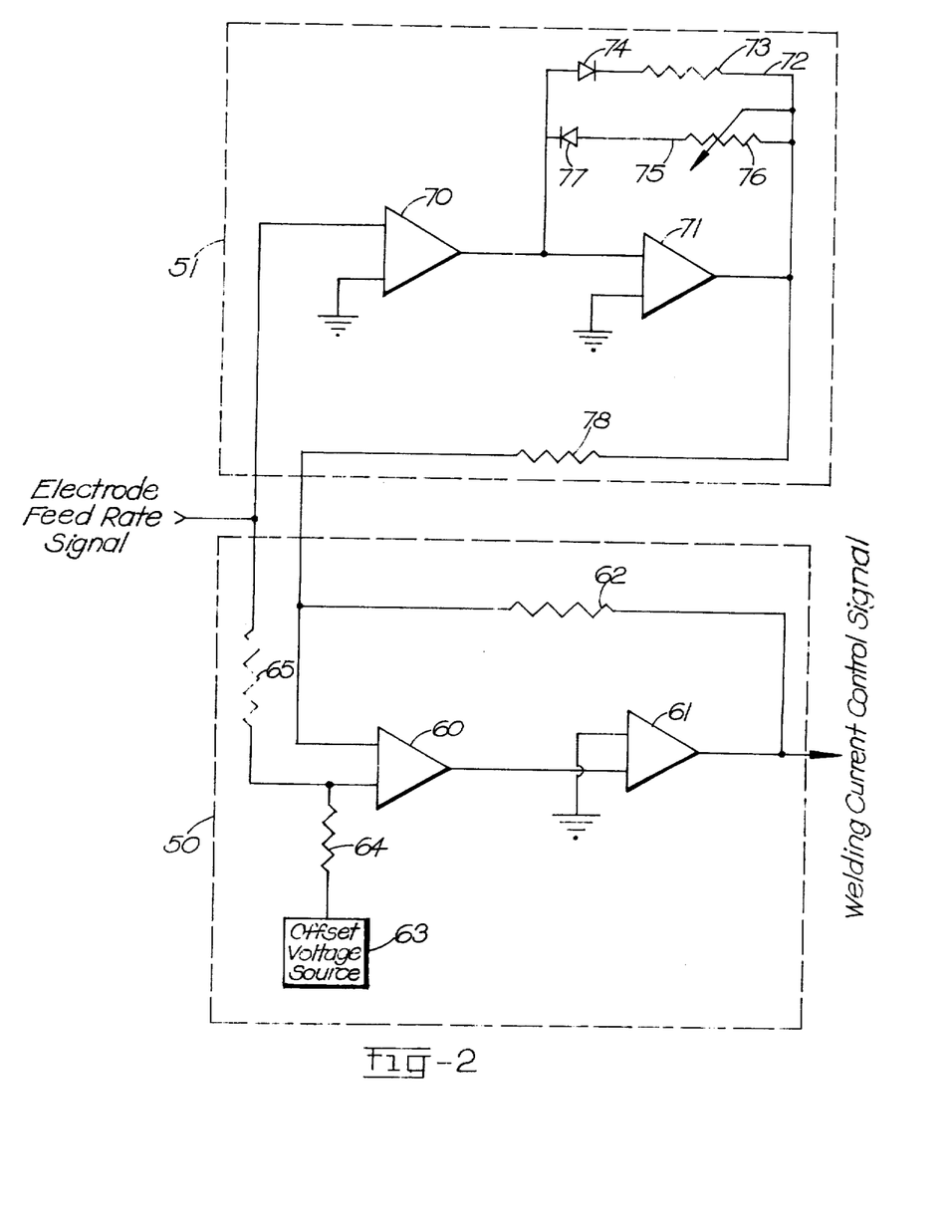
FIG. 2 is a schematic drawing of a preferred current control system.

A preferred welding current control unit is shown in schematic detail in FIG. 2 which includes the additional advantage of providing a high current surge for arc initiation. The welding current control system comprises two units, namely, a control unit 50 and a start unit 51. The control unit 50 comprises a summing amplifier 60 adapted to receive the electrode feed rate signal, a booster amplifier 61, a feed-back circuit including resistance 62 for feeding the output of amplifier 61 to the summing amplifier 60. An offset voltage source 63 and resistance 64 are included to provide an additive signal, along with the electrode feed rate signal to summing amplifier 60. The start unit 51 comprises a signal comparator 70 adapted to receive the electrode velocity signal and an integrating amplifier 71 which includes a feed-back circuit 72 containing resistance 73 and diode 74. In parallel with feed-back circuit 72 is feed-back circuit 75 containing variable resistance 76 and diode 77.

In this system, the electrode feed rate signal is fed to summing amplifier 60, along with a signal from offset voltage source 63. The output of booster amplifier 61 (the current control signal) is fed back through resistance 62 to the summing amplifier 60. The output of summing amplifier 60 is fed to booster amplifier 61. In conjunction with a magnetic amplifier controlled, constant current power source, the output of booster amplifier 61 will provide a welding current which is essentially linearly related to the electrode feed rate. The slope of the linear relationship is determined by the ohmic values of resistance 62 and resistance 65, and the slope intercept is determined by the ohmic value of resistance 64. Thus, as the velocity of the electrode filler wire changes during welding, the current will automatically follow the predetermined linear relationship.

The start amplifier unit 51 functions to provide a high surge of current to facilitate arc initiation. In this system, the electrode feed rate signal is fed to a voltage comparator 70, compared with a reference signal (usually ground) and then fed to integrating amplifier 71. The output of amplifier 71, with feedback circuit 72 including resistance 73, follows a ramp function which starts from a negative voltage, the value of which is established by resistance 73, and increases to a value at or near zero volts. The ohmic value of resistance 73 is selected to provide an initial current of at least 150% of the normal welding currrent, preferably at least 200% of the normal welding current. This ramp signal is fed to the summing amplifier 60 through resistance 78 and by this means the output of amplifier 61 (the welding current control signal) starts out at a very high level, thus providing the high surge of current for arc initiation. however, because the ramp output of integrating amplifier 71 is rapidly driving toward a value at or near zero, the welding current control signal rapidly decays to the value required to satisfy the predetermined linear relationship between electrode feed rate and welding current.

In a start condition when power is applied to all circuits, but before an arc has been struck, the DC signal representing electrode feeding rate will be nil because the wire feed rate is zero. The voltage comparator 70 output is a small positive voltage and integrating amplifier 71 output is some negative voltage determined by the value of feed-back resistance 73. The summing amplifier 60 output is at some positive voltage as determined by the negative input through resistance 78, feed-back resistance 62 and the positive voltage from the offset voltage source 63 through resistance 64. The output of booster amplifier 61 is positive as determined by the positive input from summing amplifier 60 and is the control signal to the welding power supply unit 20 which establishes the amount of welding current to be delivered when the arc is struck. The aforementioned start conditions have prepared the welding power supply unit to deliver a high starting current necessary to readily establish a stable arc when the electrode wire 14 touches the workpiece 19.

When the arc is struck and the electrode 14 is fed toward the workpiece 19, the output of the AC-DC converter 31 (the electrode feed rate signal) increases in a positive polarity At some small electrode feed rate signal, the output of comparator amplifier 70 switches to a negative voltage and integrating amplifier 71 begins the integration of this signal in a positive direction. The negative output of integrating amplifier 71 decreases in the positive direction essentially as a ramp function. Slope of the ramp is determined by the feedback circuit 72 including resistance 73, and by the integration capacitance of amplifier 71 to a constant value at a point at or near zero voltage. The constant value to which the output of amplifier 71 approaches at or about a zero value can be varied by changing the resistance value of variable resistance 76. After the integration period, the output of amplifier 71 will then remain constant until the arc is terminated.

During the integration time of integrating amplifier 71, the signal representing the weld filler wire feed rate is also driving summing amplifier 60 through resistance 65. The slope of the output of summing amplifier 60 is determined by the ohmic values of resistance 64 and feed-back resistance 62 and the positive voltage from the offset voltage source 63. The operating point on this slope at a given point in time is determined by the signals through resistances 65 and 78. Because the signal through 78 is increasing in the positive direction at a rate more rapid than the positive signal going through 65, the outputs of amplifiers 60 and 61 will be decreasing positive voltages until the output of integrating amplifier 71 reaches a constant output which occurs at the end of its integration time. Amplifier 71 is adapted to complete its integration a short time (e.g., a few milliseconds) after the wire feed rate has stabilized at a preselected value. With most commercially available wire feeders, a stabilized feed rate occurs in less than 500 milliseconds. For the remainder of the welding operation, the outputs of summing amplifier 60 and booster amplifier 61 will not change unless the wire feed rate changes. Any changes in wire feed rate during the welding pass will shift the output of summing amplifier 60 up or down the preset slope determined by resistance 64 and resistance 62 and the voltage from source 63, and in this way demand a welding current appropriate to the electrode filler wire velocity. The ohmic values of resistances 64 and 62 are selected for the particular electrode wire composition and diameter and shielding gas composition. Preferably, these values are readily changeable to allow modifications in the field or shop without major modifications of the control system so that a wide range of wire composition and size and inert gas composition can be readily accommodated by the control system. A suitable system would include a bank of resistances of various values with a suitable switch selector provided to electrically connect the appropriate resistances and the voltage from the offset voltage source.

To accommodate for out-of-position welding or welding in situations of limited arc access, a variable resistance 76 is included in series with diode 77, the combination being parallel to feed-back circuit 72, to change the constant output of amplifier 71 by a small amount which in turn changes the control signal to the welding power supply a small amount. Diode 77 is included to prevent current from feeding a signal back through this circuit to the integrating amplifier 71 during the integration time. This portion of the circuit is therefore essentially nonoperative until the output of 71 has reached a relatively constant value. Resistance 76 can be deleted if the out-of-position welding function is not desired and diode 77 retained to clamp the output of amplifier 71 to zero volts at the end of the integration time. Current variation of ±10% is usually adequate for most welding positions.

Preferably, comparator 70, integrating amplifier 71 and summing amplifier 60 are supplied with power from the same source (e.g., ±15 VDC) and booster amplifier 61 is supplied from a separate source (e.g., ±14.5 VDC). The booster amplifier 61 and its separate power source should be provided with suitable safety features to prevent any large transient signals from the welding power supply from causing any damage to the control unit circuits.

The above-described control system is designed for use in conjunction with a magnetic amplifier controlled constant current power source so as to provide a welding current which is essentially linear with respect to the electrode feed rate. Because of the inherent characteristics of this type of power supply, the control signal is not linear with respect to the electrode feed rate signal, but it does control the output of the power source so that the welding current is linear with respect to the electrode feed rate signal. Suitable modification must be made to the control unit if other power sources, such as those having silicon controlled rectifiers, are to be employed.

Figure 3:
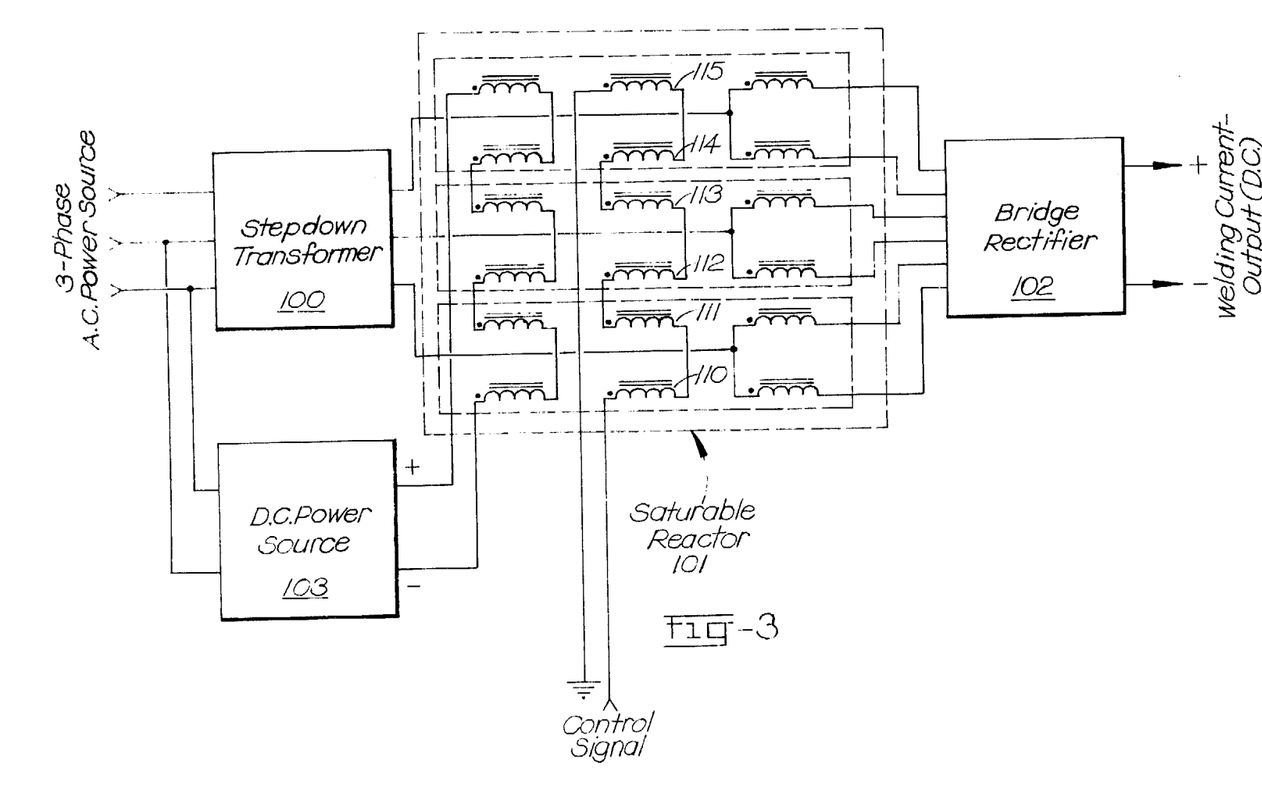
FIG. 3 is a schematic diagram of a suitable constant current electrical power source for the present invention.

In FIG. 3 a simplified schematic diagram is shown of a suitable magnetic amplifier controlled constant current power source which comprises a step down transformer 100, a saturable reactor 101, a bridge rectifier 102 and a DC bias winding power supply 103. As shown, the current control signal from the control amplifier 50 (FIG. 2) is fed to the bank of control windings 110–115 in the saturable reactor 101 which, in response to the control signal, control the power source so as to provide the desired welding current. The various components of the welding power source are conventional and need not be described in detail.

The above-described preferred embodiment of the present control system is based primarily on the fact that in the current range normally employed in most welding applications, the electrode burn-off or melt-off rate is essentially linearly related to the welding current. In the system shown in FIG. 2, the desired slope of the linear relationship can be obtained by selecting the appropriate ohmic values for resistance 64 and resistance 62 and the voltage from source 63. It is recognized that electrode meltoff rate is not actually linear with respect to welding current, but is, in fact, a function of (among others) the current squared ($I^2$). However, within the normal range of welding current employed in GMA welding, the assumption of linearity is fairly accurate. For example, in the GMA welding of aluminum products, the welding current can range from 50–800 amps, but usually ranges from about 150–500 amps and an assumption of linearity within this range is in error by less than about 5%. Moreover, it has been found that this assumption of linearity can be used both well above and below the normal ranges of welding current. At extremely high current levels, the arc force is sufficient to cause frequent and periodic movement of weld metal pool surface. These variations in the weld pool surface result in variations in arc length and cause a wide scatterband in the electrode melt-off rate to welding current relationship. An assumption of linearity in this area is adequate. Similarly, at low levels of current, the molten metal transfer becomes globular, instead of small droplets, again causing a wide scatterband in the electrode melt-off rate to welding current relationship, which allows the use of the assumption of linearity.

Frequently, it is desirable to crater fill in other than a flat position. However, with the above-described system, this is not practical because with a given arc length as the current is decreased below a particular level, the metal transfer from the electrode tip changes from a spray-type transfer, wherein the direction of metal transfer is controlled by arc forces, to a globular transfer, wherein the direction of metal transfer is essentially controlled by gravity. It has been found that by providing a pulsating DC current in the lower current range at or below a predetermined level of current where metal transfer is globular, crater filling in other than the flat position becomes feasible. To accomplish this result, the average current during the pulsating period should be essentially linear with respect to electrode feed rate in accordance with the invention. However, the peak current during each pulse must be sufficient to generate arc forces which can control the direction of the molten metal transferred from the electrode tip and the minimum current during each pulse must be sufficient to sustain the arc. One method of accomplishing this is to gradually decrease the period at maximum current or gradually increase the period at minimum current as the electrode feed rate decreases. The combined method of diminishing time at maximum current and increasing time at minimum current is shown ideally in FIG. 5. The dashed line indicates the average current which is essentially linear with respect to wire feed rate. A suitable system would be a separate circuit, parallel to the arc, which would shunt portions of the welding current at a desired frequency through the parallel circuit, thus correspondingly reducing the arc current in the desired manner. The circuit is appropriately designed to allow for changes in the time at peak arc current and minimum arc current. For welding aluminum products, the peak current employed generally should be greater than 70 amperes for small diameter weld wire and up to 600 amperes or more for large diameter weld wire. The minimum current should be greater than 25 amperes. Preferably, the frequency of the pulsed current should be greater than 40 cycles per second because below this frequency, the arc has a visible flicker which may be irritating to the welding operator.

In summary, the purpose of the control unit 50 is to translate the electrode feed rate signal into a current control signal which represents a welding current appropriate for the weld wire diameter and alloy composition and the shielding gas mixture being used. The start unit 51 provides an additive signal to the low initial output of control unit 50 during arc initiation to ensure the high current necessary for a fast, reliable arc start. The start amplifier 51 can also modify the output of the control unit 50 by means of the variable resistance 76 to adapt the system to various welding situations.

In the above-described embodiment, the control unit is primarily designed for a constant current welding power supply having a magnetic amplifier type of current control, which has a desirable steep volt-ampere output curve. Suitable commercially available constant current power supplies include Model DC4C manufactured by the National Standard Company, Strongsville, Ohio.

Figure 4:
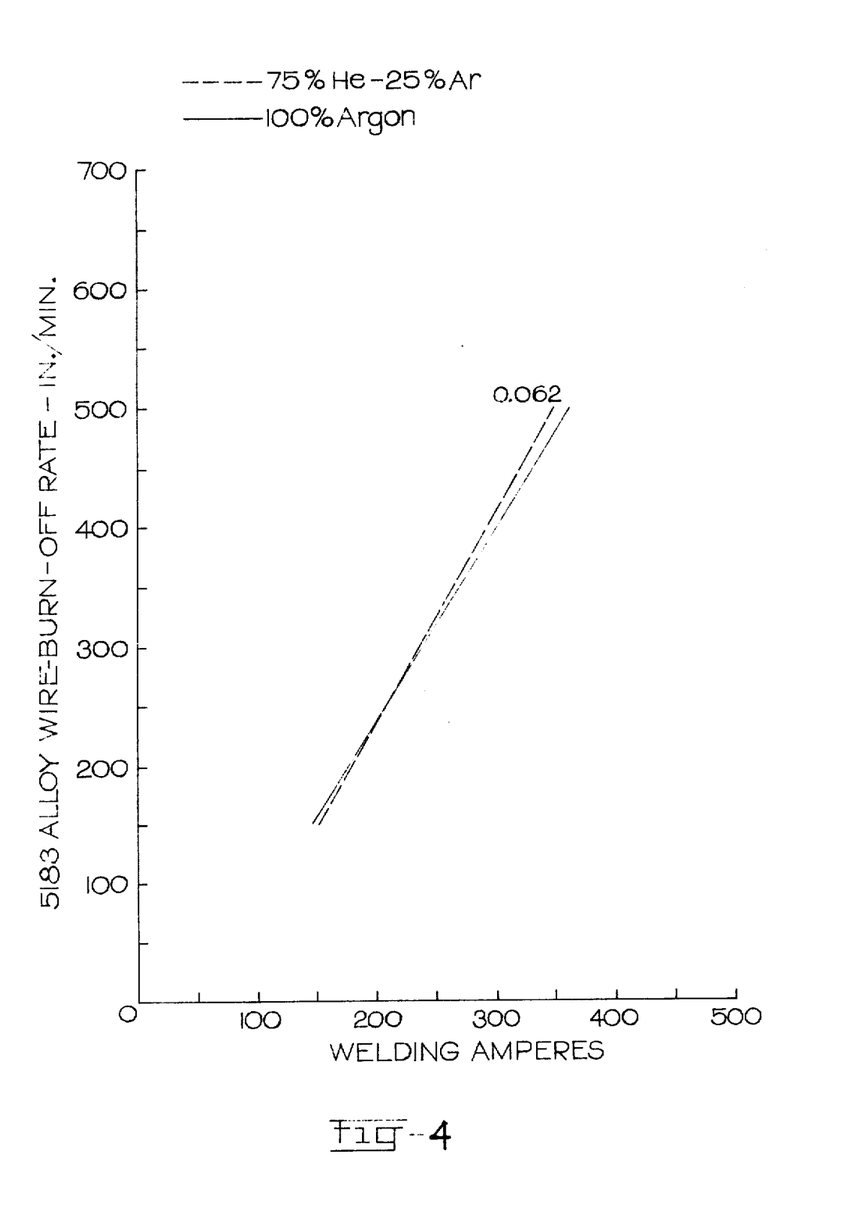
FIG. 4 is a graph showing the relationship of electrode burn-off rate with respect to welding current.

As an example of the present invention, reference is made to FIG. 4 which is a graph of the melt-off rate of 0.062 inch diameter 5183 aluminum alloy wire versus welding amperage for flat position bead-on-plate welding with an inert gas of 75% helium-25% argon and an inert gas of 100% argon. The equation for the mixed gas line is:

Wire Feed Rate (in/min) = 1.76 × Current (amps) − 115

For other conditions, such as different weld wire composition and size or different shielding gas composition, suitable equations can be formulated empirically with the appropriate slope for the proposed conditions.

With the same set of conditions as above, except that the welding is conducted in a deep (1½ inches) groove having a 40° included angle, the current would have to be reduced about 8% to maintain an optimum arc length. In the control system shown in FIG. 2, this current reduction can be accomplished by merely varying the ohmic value of resistance 76 to increase the output of amplifier 71 in the positive direction. No other changes are required. The same equation can be utilized and no changes are required in resistance 64 and resistance 62.

For welding aluminum products, the amounts of shielding gas range up to 50 cubic feet per hour for mixed gases (i.e., 75% helium-25% argon) and up to 35 cubic feet per hour for 100% argon.

The above-described system of FIGS. 1 and 2 is an open-loop system in that the actual welding current is not compared with the desired welding current. If a closed loop system is needed or desired, suitable current sensing means and comparing and controlling means can be provided to close the loop in a manner which is well known to those skilled in the art. Moreover, it is recognized that other arc starting systems than that shown in FIG. 2 can be employed with constant current electrical power sources. For example, a low voltage power source could be included to provide a low voltage-high current surge.

Although the invention has been discussed primarily in terms of a system utilizing a constant current welding power source, the invention is fully applicable to a constant voltage welding power source with suitable modifications to the control circuitry which is well within the capabilities of those skilled in the art. Moreover, it is obvious that various modifications and improvements can be made to the present invention without departing from the spirit of the present invention or the scope of the appended claims.

What is claimed is:

1. In the method of controlling the welded current in an inert gas shielded, consumable electrode arc welding process, wherein an independently controlled electrode wire feeding device operates to feed electrode wire through a welding torch to a workpiece and an electrical power source provides welding current to said electrode wire, the improvement in the control of the welding current during welding start-up and operation comprising:

a. by means independent of said wire feeding device, sensing the actual velocity of the electrode wire being fed to a workpiece when said electrode wire feeding device is being controlled and generating a signal representing the actual velocity sensed; and b. receiving said velocity signal and by means responsive to said velocity signal generating a second signal to control the welding current output of said electrical power source to provide a welding current to said electrode wire which satisfies a predetermined relationship between the welding current and electrode wire velocity.

2. The method of claim 1 wherein said electrical power source is a constant current power source.

3. The method of claim 2 wherein said electrical arc is established between the electrode and the workpiece by supplying a high surge current from said electrical power source at least 150% of the welding current satisfying said relationship.

4. The method of claim 1 wherein said relationship between the velocity of the electrode filler wire and welding current is a substantially linear relationship.

5. The method of welding of claim 1 adapted to allow for out-of-position crater filling wherein a pulsating welding current is supplied to said electrode when the welding current is reduced below a predetermined level, the average current value of said pulsating current satisfying said predetermined relationship.

6. The method of claim 1, wherein said welding current control signal value is changed to effect a change of up to ±10% in the welding current required by said relationship for out-of-position welding or welding with limited arc access.

7. A welding current control system adapted for an inert gas shielded, consumable electrode arc welding apparatus which includes a welding torch, an independently controlled electrode wire feeding device and an electrical power source for providing welding current to an electrode wire, the improvement in the current control system for welding start-up and operation comprising:
  a. means independent of said wire feed device to sense the actual velocity of electrode wire being fed to a workpiece when said wire feeder means is being controlled and to generate a signal representing said velocity; and
  b. means to receive said velocity signal and in response thereto to generate a control signal to control the welding current output of said electrical power source to provide a welding current which satisfies a predetermined relationship between the welding current and electrode wire velocity.

8. The system of claim 7 wherein said means responsive to said velocity signal generates a control signal which represents a welding current linearly related to the velocity of said electrode, said means responsive to said velocity signal comprising
  a. a summing means adapted to receive said velocity signal;
  b. an offset voltage source electrically connected to said summing means and adapted to provide a signal which is additive to the velocity signal fed to said summing means;
  c. means to amplify the output of said summing means; and
  d. feed-back means associated with said amplifying means to feed the output of said amplifying means through a resistance to said summing means, the output of said amplifying means representing a welding current which satisfies said linear relationship.

9. The system of claim 7 including means to change the welding current control signal so as to effect a change in the welding current of up to ±10% of said value to accommodate said system for out-of-position welding or welding with limited arc access.

10. The control system of claim 7 including means responsive to said control signal to control an electrical power source so as to provide said welding current in accordance with the velocity of said electrode.

11. The system of claim 10 wherein said electrical power source is a constant current power source.

12. The system of claim 11 including means to generate a welding current control signal representing high surge of current to facilitate electrical arc initiation.

13. The system of claim 12 wherein said means to provide a high surge current for electrical arc initiation comprises
  a. a means to receive a signal representing the velocity of the welding electrode filler wire;
  b. means to compare said velocity signal with a reference signal;
  c. a signal integrating means adapted to receive the output of said signal comparing means, said integrating means having an output signal which follows a ramp function; and
  d. means to feed said ramp signal to said means responsive to said velocity signal so as to generate a control signal for an electrical power source to provide a high surge of welding current for arc initiation.

14. The system of claim 13 wherein said means to provide a high surge of welding current is adapted to provide a current of at least 150% of the welding current required by said relationship.

15. The system of claim 13 having a signal feed-back means, which includes a variable resistance means, associated with said signal integrating means, whereby the value of said welding current control signal can be modified to accommodate said system for out-of-position welding or welding with limited arc access by changing the welding current up to ±10% of the value required by said relationship.

* * * * *

UNITED STATES PATENT OFFICE
CERTIFICATE OF CORRECTION

Figure 5:
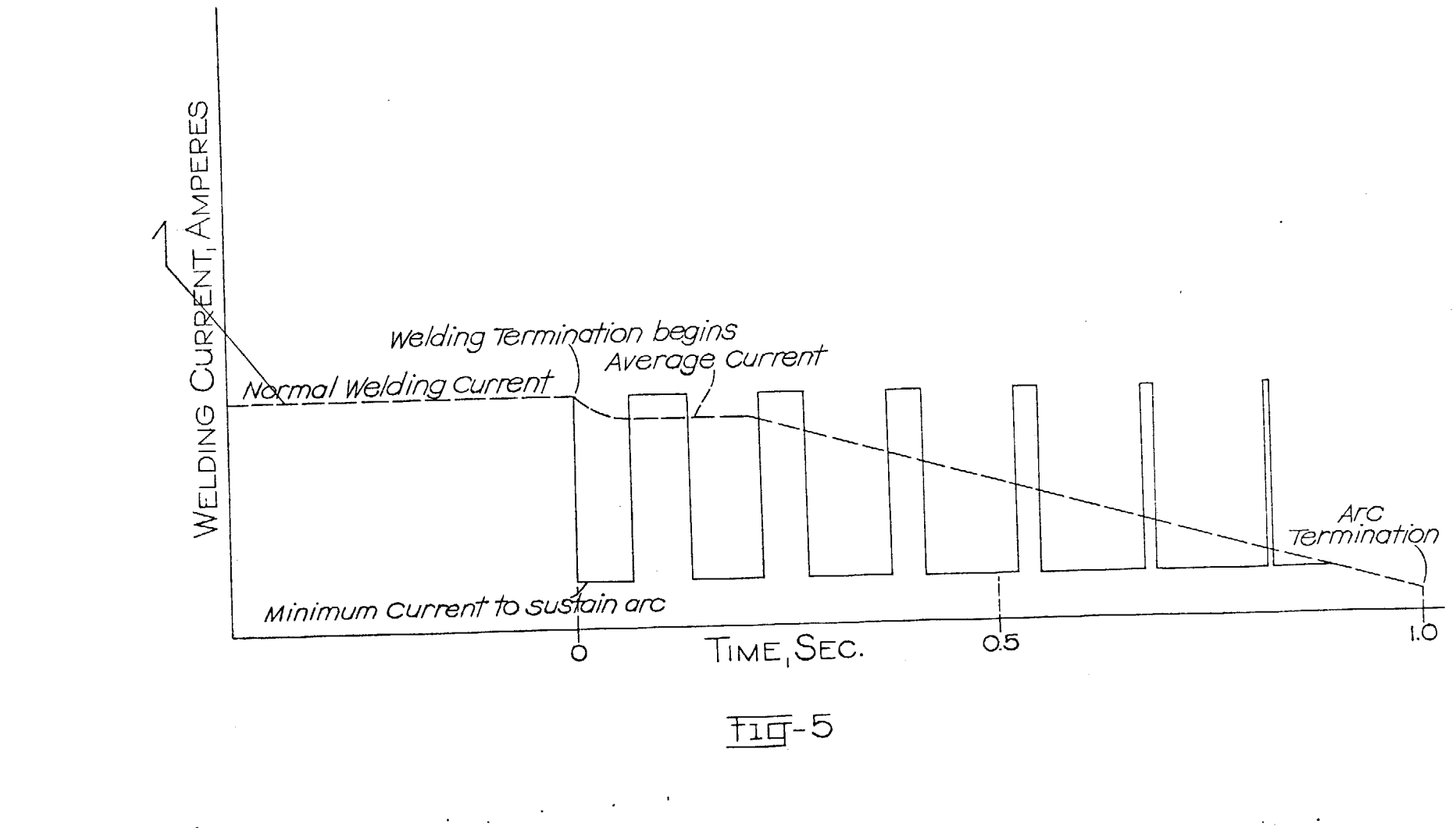
FIG. 5 is an idealized graph illustrating a pulsating current for arc termination in accordance with one embodiment of the invention.

PATENT NO. : 3,906,184
DATED : September 16, 1975
INVENTOR(S) : Francis E. Gibbs and John J. Dempsey It is certified that error appears in the above-identified patent and that said Letters Patent are hereby corrected as shown below:

Add Figure 5 - as shown on the attached sheet.

Column 4, line 55 "polarity At" should be --polarity. At--

*Signed and Sealed this*

*seventeenth* Day of *February 1976*

[SEAL]

Attest:

RUTH C. MASON
*Attesting Officer*

C. MARSHALL DANN
*Commissioner of Patents and Trademarks*

FIG-5